United States Patent
Gostin et al.

(10) Patent No.: US 7,471,623 B2
(45) Date of Patent: Dec. 30, 2008

(54) SYSTEMS AND METHODS FOR A UNIFIED COMPUTER SYSTEM FABRIC

(75) Inventors: Gary B. Gostin, Plano, TX (US); Craig Warner, Addison, TX (US); John W. Bockhaus, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 10/998,239

(22) Filed: Nov. 23, 2004

(65) Prior Publication Data
US 2006/0153226 A1 Jul. 13, 2006

(51) Int. Cl.
*H04L 1/00* (2006.01)
(52) U.S. Cl. .................. 370/217; 370/228; 370/386
(58) Field of Classification Search .......... None
See application file for complete search history.

(56) References Cited

U.S. PATENT DOCUMENTS

| | | | |
|---|---|---|---|
| 4,853,831 A | 8/1989 | Tsuchiya | |
| 6,014,690 A * | 1/2000 | VanDoren et al. | 709/215 |
| 6,014,709 A | 1/2000 | Gulick et al. | |
| 6,065,077 A * | 5/2000 | Fu | 710/100 |
| 6,681,293 B1 * | 1/2004 | Solomon et al. | 711/122 |
| 7,039,836 B2 * | 5/2006 | Powers et al. | 714/48 |

OTHER PUBLICATIONS

Whitepaper from Hewlett-Packard Company (meet the hp superdome servers, pp. 1-31, May 2002.*
Aono et al , The AzusA 16-Way Itanium Server, IEEE, pp. 54-60, 2000.*

* cited by examiner

*Primary Examiner*—Frank Duong

(57) ABSTRACT

Disclosed are systems and methods providing a unified system fabric in a computer. The systems and methods of embodiments including first interface disposed between a first component of the computer system and a second component of the computer system, the first interface implementing an interface protocol, and a second interface disposed between the first component of the computer system and a third component of the computer system, the second interface implementing the interface protocol, wherein the first interface and the second interface comprise separate signal paths at the first component.

24 Claims, 5 Drawing Sheets

FIG. 3A

| MICROPACKET | 151  144 | 143  128 | 127                                      112 | 111                    96 | 95                   80 | 79                  64 | 63                     48 | 47                  32 | 31  16 | 15  0 |
|---|---|---|---|---|---|---|---|---|---|---|
| 0 | | PARITY | HEADER 1 (63:0) | | | | HEADER 0 (63:0) | | | UNUSED (15:0) |

BIT POSITION

LENGTH = 1 MICROPACKET

FIG. 3B

| MICROPACKET | 151  144 | 143  128 | 127                                      112 | 111                    96 | 95                   80 | 79                  64 | 63                     48 | 47                  32 | 31  16 | 15  0 |
|---|---|---|---|---|---|---|---|---|---|---|
| 0 | | PARITY | HEADER 1 (63:0) | | | | HEADER 0 (63:0) | | | UNUSED (15:0) |
| 1 | | PARITY | DATA 1 (63:0) | | | | DATA 0 (63:0) | | | UNUSED (15:0) |

BIT POSITION

LENGTH = 2 MICROPACKETS

FIG. 3C

| MICROPACKET | 151  144 | 143  128 | 127  112 | 111  96 | 95  80 | 79  64 | 63  48 | 47  32 | 31  16 | 15  0 |
|---|---|---|---|---|---|---|---|---|---|---|
| 0 | PARITY | HEADER 1 [63:0] | | | | HEADER 0 [63:0] | | | | DATA 0 [15:0] |
| 1 | PARITY | DATA 1 [63:0] | | | | DATA 0 [63:16] | | | DATA 2 [31:0] | |
| 2 | PARITY | DATA 3 [63:0] | | | DATA 2 [63:32] | | | DATA 4 [47:0] | | |
| 3 | PARITY | DATA 5 [63:0] | | | DATA 4 [63:48] | | DATA 6 [63:0] | | | |
| 4 | PARITY | DATA 7 [63:0] | | | DATA 9 [15:0] | | DATA 8 [63:0] | | | |
| 5 | PARITY | DATA 9 [63:16] | | | DATA 11 [31:0] | | DATA 10 [63:0] | | | |
| 6 | PARITY | DATA 11 [63:32] | | DATA 13 [47:0] | | | DATA 12 [63:0] | | | |
| 7 | PARITY | DATA 13 [63:48] | | DATA 15 [63:0] | | | DATA 14 [63:0] | | | |

BIT POSITION

LENGTH = 8 MICROPACKETS

SYSTEMS AND METHODS FOR A UNIFIED COMPUTER SYSTEM FABRIC

DESCRIPTION OF RELATED ART

Computer systems employ a number of interfaces to provide communication and/or control between components thereof. These inter-component interfaces collectively provide a computer system fabric through which data and control signals pass to facilitate interaction defining operation as a computer system.

For example, a central processing unit (CPU) or other processor sub-system, providing primary control of computer system operation, may interact with a number of other components, such as may comprise a memory sub-system, an input/output (I/O) sub-system, etcetera, through interconnections of a system fabric. In a cell based architecture, such as that implemented in the HP Superdome server system available from the Hewlett-Packard Company, Palo Alto, Calif., a processor/memory sub-system may comprise a cell board coupled to other processor/memory sub-systems (e.g., cell boards of a multi-processor system), I/O sub-systems, crossbar switches, etcetera. Interaction with such components by the cell boards is provided through the use of various interfaces. The foregoing interfaces are typically optimized for the particular components for which the interface is employed. Accordingly, an interface used with respect to a cell board communicating with another cell board is different than an interface used with respect to a cell board communicating with an I/O sub-system, and so on.

The different interfaces forming the computer system fabric described above typically provide substantial differences both in the physical interface (e.g., the type of signaling used, the voltage levels/swings, the number of channels, the transfer rate, the signal clocking, etcetera) and the interface protocol (e.g., the way that messages are encoded, the way in which control overhead is implemented, error detection and/or correction algorithms implemented, etcetera). Accordingly, separate development, support, and upgrade efforts are implemented with respect to these interfaces. Such separate development efforts can result in an increase in the total amount of time and effort required in developing the interfaces, and thus the computer system. Separate support efforts, in addition to increasing costs, can result in duplication of efforts in diagnosing and resolving problems. Separate upgrade efforts can result in added cost and efforts required in evolving multiple separate interfaces, thus delaying later evolutions of the computer system.

BRIEF SUMMARY OF THE INVENTION

A system providing a unified system fabric in a computer, the system comprising a first interface disposed between a first component of the computer system and a second component of the computer system, the first interface implementing an interface protocol, and a second interface disposed between the first component of the computer system and a third component of the computer system, the second interface implementing the interface protocol, wherein the first interface and the second interface comprise separate signal paths at the first component.

A method for providing a unified computer system fabric, the method comprising determining a physical interface configuration which is optimized for communication between at least one of a first component, a second component, and a third component having a most demanding bandwidth requirement, establishing an interface protocol having a superset of communications that are to be transmitted between each of the first component, the second component, and the third component, providing a first interface between the first component and the second component, the first interface implementing the physical interface configuration and the interface protocol, and providing a second interface between the first component and the third component, the second interface implementing the physical interface configuration and the interface protocol.

A computer system having a unified system fabric, the system comprising a processor cell component, an input/output component, a computer system component operable with at least one of the processor cell component and the input/output component, a first interface coupling the processor cell component to the input/output component, the first interface implementing a physical interface configuration and an interface protocol, and a second interface coupling the computer system component to at least one of the processor cell component and the input/output component, the second interface implementing the physical interface configuration and the interface protocol.

BRIEF DESCRIPTION OF THE DRAWINGS

FIGS. 3A-3C show embodiments of packet configurations utilized according to embodiments of the present invention.

DETAILED DESCRIPTION

Figure 1:
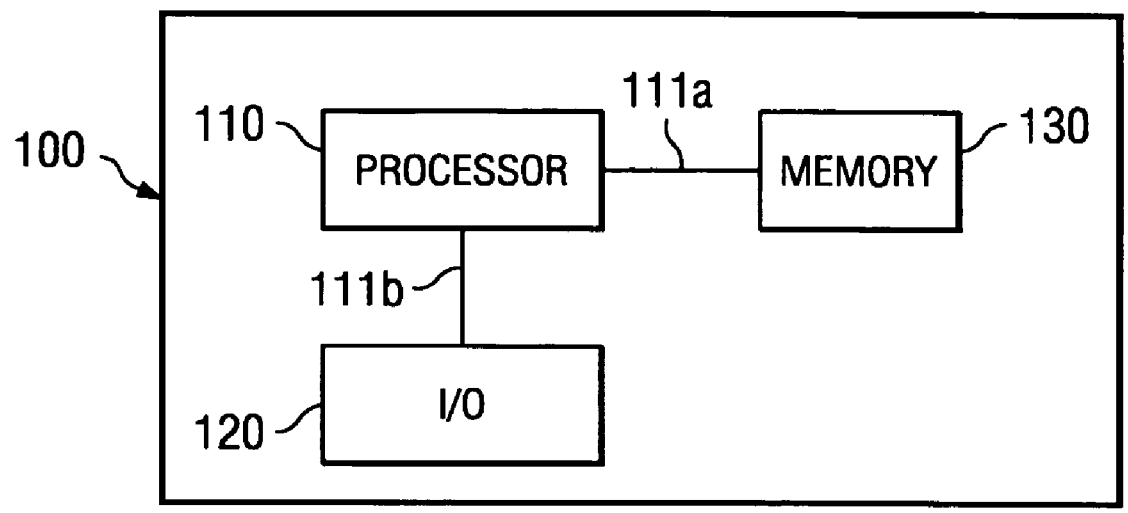
FIG. 1 shows a high level block diagram of a system implementing an embodiment of the present invention.

Directing attention to FIG. 1, a computer system having a unified fabric according to an embodiment of the present invention is shown. Computer system 100 of FIG. 1 includes various components, shown here as processor sub-system 110, input/output (I/O) sub-system 120, and memory sub-system 130, in communication via interfaces 111a and 111b. Processor sub-system 110 may comprise a central processing unit (CPU) providing execution of instructions. I/O sub-system 120 may comprise bridge controllers and supporting circuitry (e.g., interface controllers, address registers, etcetera) operable to provide a bridge between industry standard protocols, such as PCI-X, and a proprietary protocol used within the fabric of computer system 100. Memory sub-system 130 may comprise memory devices (e.g., static and/or dynamic memory circuits, non-volatile memory, magnetic memory, optical memory, etcetera) and supporting circuitry (e.g., interface controllers, address registers, etcetera) operable to provide storage and retrieval of data used by computer system 100. Interfaces 111a and 111b provide interconnection of processor sub-system 110, I/O sub-system 120, and memory sub-system 130, and thus provides a part of the system fabric of computer system 100.

Computer system 100 may comprise a cell architecture according to an embodiment of the invention. In such an embodiment processor sub-system 110 may comprise a cell board, providing a CPU and memory sub-system. For example, a cell board may have a CPU and supporting circuitry (e.g., interface controllers, cache memory, etcetera) for use as a part of a multi-processor system architecture.

Although the components shown in the embodiment of FIG. 1 include a processor sub-system, an I/O sub-system, and a memory sub-system, the concepts of the present invention may be applied to any number of different components of a computer system in addition to or in the alternative to those shown in FIG. 1. For example, components provided a unified fabric interface according to embodiments of the present invention may include switch/crossbar components in addition to or in the alternative to any of the foregoing. Components provided an interface according to embodiments of the present invention may be fully integrated (e.g., memory components disposed on a same integrated circuit substrate as a processor component) or may be physically separated (e.g., disposed upon a same circuit board or disposed upon different circuit boards). Accordingly, unified system fabric interfaces of embodiments of the present invention may be used in providing interconnection from board to board or board to backplane using standard connectors, between boards, backplanes, and chassis using cables, and/or the like.

Moreover, interconnections provided between sub-systems or other components according to embodiments of the present invention may be different than those represented in FIG. 1. For example, a plurality of processor sub-systems, such as those of a multi-processor system, may be interconnected using interfaces of embodiments of the present invention. A plurality of interfaces may be used between each of two or more components according to embodiments of the invention, such as to provide increased bandwidth, fault tolerance, redundancy, etcetera. Additionally or alternatively, rather than the separate interfaces illustrated in FIG. 1, each of a plurality of components (e.g., three or more) may be coupled to a same interface, such as in an interface bus configuration, if desired.

Interfaces 111a and 111b each have a physical interface (e.g., the type of signaling used, the voltage levels/swings, the number of channels, the transfer rate, the signal clocking, etcetera) and interface protocol (e.g., the way that messages are encoded, the way in which control overhead is implemented, error detection and/or correction algorithms implemented, etcetera) associated therewith. The physical interface and interface protocol associated with interface 111a are the same as the physical interface and interface protocol associated with interface 111b according to an embodiment of the invention, although the components interfaced thereby have differing communications criteria associated therewith. Accordingly, interfaces 111a and 111b of embodiments of the invention provide a unified system fabric with respect to computer system 100 having a single, common physical interface and packet protocol that meets the needs of all of the sub-systems interconnected thereby (e.g., processor sub-system, I/O sub-system, and memory sub-system).

The unified system fabric provided according to embodiments of the present invention provides a number of advantages and may be implemented in various ways. For example, unified system fabric interfaces provided according to embodiments of the present invention reduce system development time, as well as subsequent evolution development time, because a common physical interface and interface protocol is developed, designed for, implemented, and evolved, rather than a plurality of interfaces using different physical interfaces and different interface protocols. Moreover, unified system fabric interfaces of the present invention provide flexibility in the interconnection of sub-systems or other system devices.

Unified system fabric interfaces provided according to embodiments of the present invention may implement one or more differences there between and still substantially benefit from the foregoing advantages. For example, interfaces provided according to an embodiment of the present invention may implement a difference in the physical interface, such as to provide a first interface having a 3.2 gigatransfers/second transfer frequency (e.g., for CPU to CPU interfacing) and a second interface having a lower transfer frequency (e.g., for CPU to I/O interfacing), while maintaining commonality in all other regards. Such configuration facilitates the use of a unified system fabric of an embodiment of the present invention in an environment that does not fully support the maximum transfer frequency. However, such embodiments continue to benefit from reduced system development times, and reduced subsequent evolution development times.

Figure 2D:
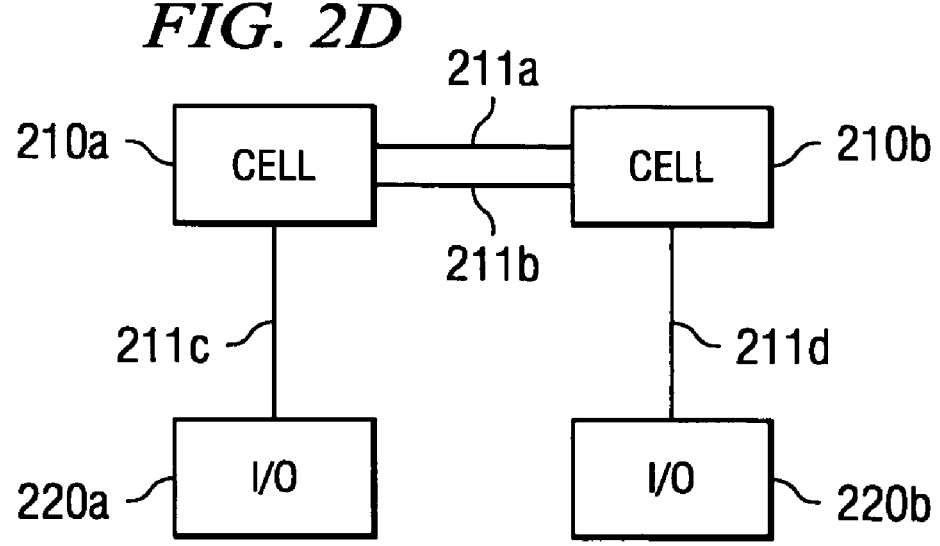
FIGS. 2A-2D show various embodiments of system topologies according to embodiments of the present invention.
Figure 2A:
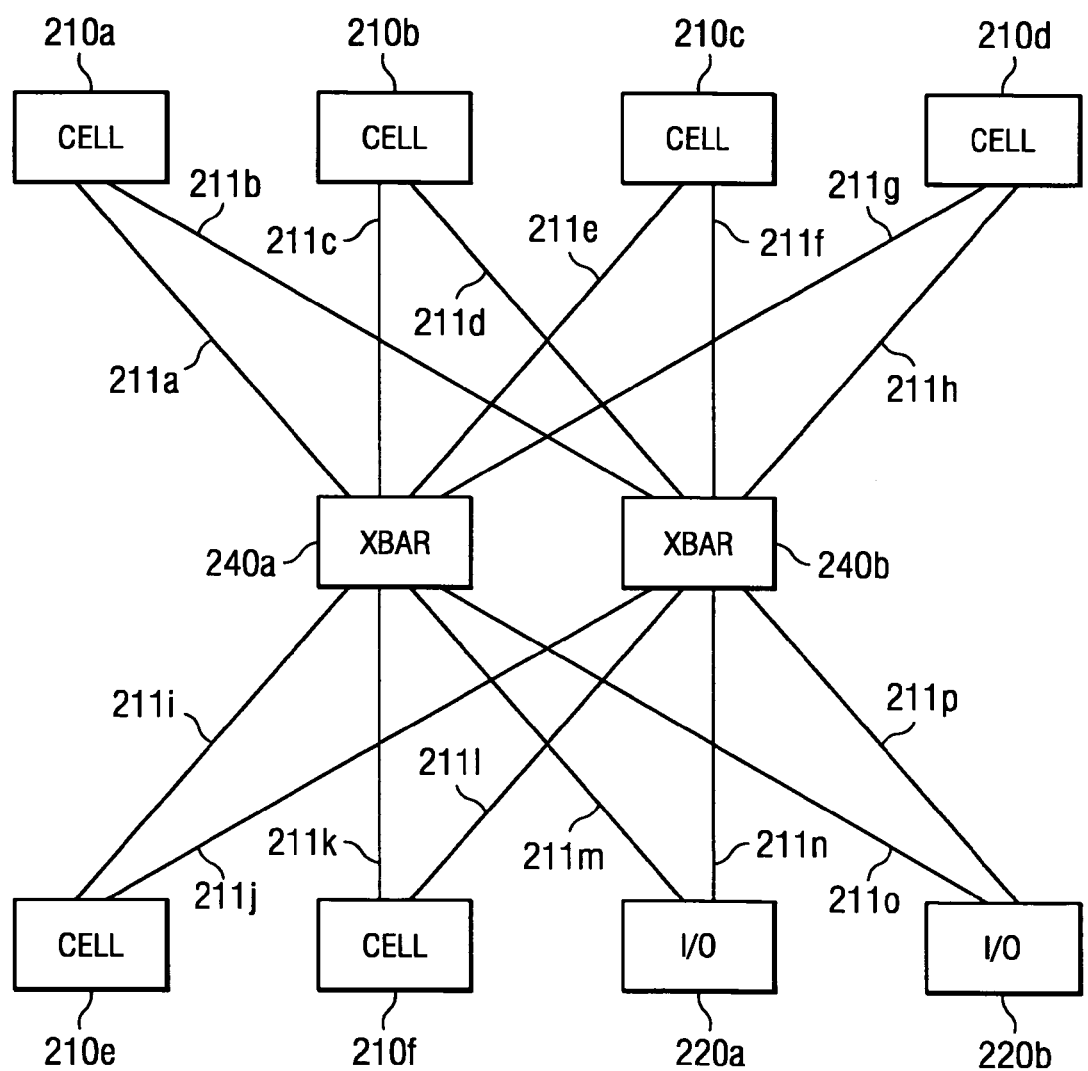

Directing attention to FIGS. 2A-2D wherein various system configurations are provided using interfaces of a unified system fabric according to embodiments of the present invention. For example, the embodiment of FIG. 2A provides a compute intensive system configuration in which a relatively large plurality of processor sub-systems, shown here as cells 210a-210f, are connected to a relatively small number of I/O sub-systems, shown here as I/O 220a and 220b, through crossbar switching apparatus (e.g., a central switch, such as may be disposed on a back plane, which provides all the pathways of communications between components), shown here as crossbar switches 240a and 240b, using unified system fabric interfaces. Specifically, interfaces 211a-211l provide interconnection of cells 210a-210f and, using interfaces 211m-211p, provide interconnection of cells 210a-210f and I/O 220a and 220b. Interfaces 211m-211p provide interconnection of I/O 220a and 220b and, using interfaces 211a-211l, provide interconnection of I/O 220a and 220b and cells 210a-210f. Each of interfaces 211a-211p utilizes a same physical interface and interface protocol, thereby providing flexibility with respect to interconnection of any of cells 210a-210f and I/O 220a and 220b.

Figure 2B:
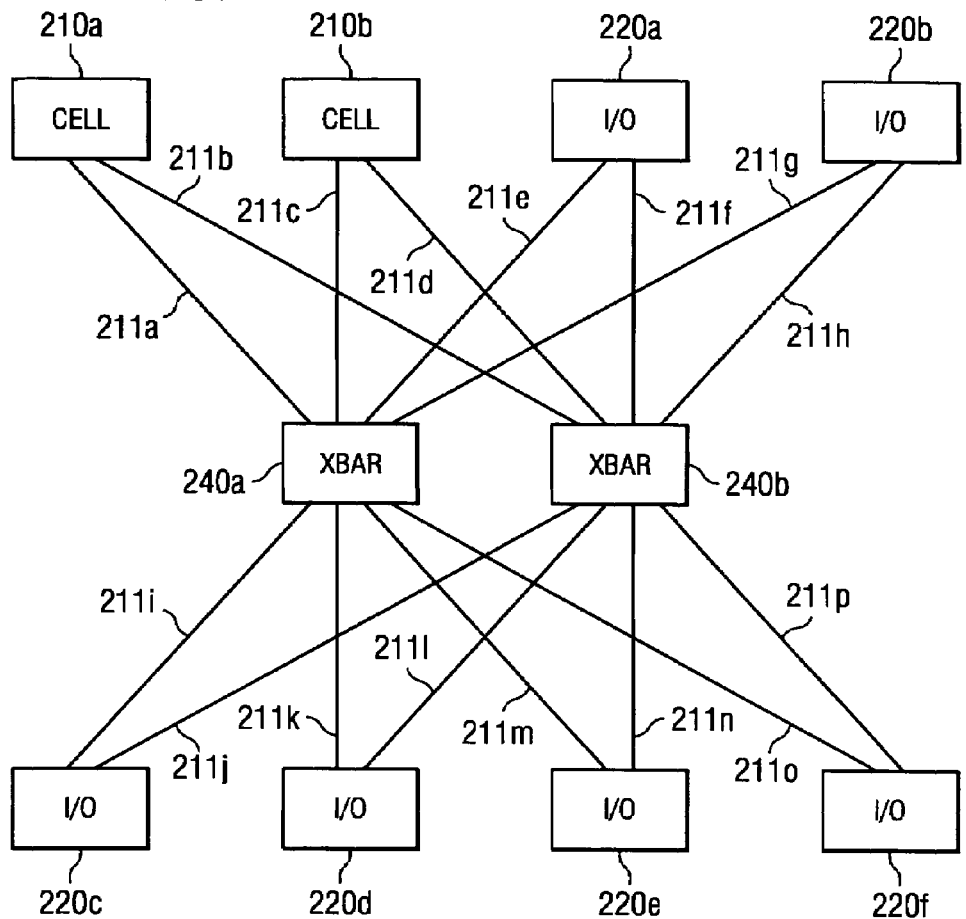

FIG. 2B, although implementing the same computer system fabric in a similar topology to that of FIG. 2A, provides an input/output intensive system configuration in which a relatively large plurality of I/O sub-systems, shown here as I/O 220a-220f, are connected to a relatively small number of processor sub-systems, shown here as cells 210a and 210b, through crossbar switching apparatus, shown here as crossbar switches 240a and 240b, using unified system fabric interfaces. Specifically, interfaces 211e-211p provide interconnection of I/O 220a-220f and, using interfaces 211a-211d, provide interconnection of I/O 220a-220f and cells 210a and 210b. Interfaces 211a-211d provide interconnection of cells 210a and 210b and, using interfaces 211e-211p, provide interconnection of cells 210a and 210b and I/O 220a-220f. Each of interfaces 211a-211p utilizes a same physical interface and interface protocol, thereby providing flexibility with respect to interconnection of any of cells 210a and 210b and I/O 220a-220f.

Figure 2C:
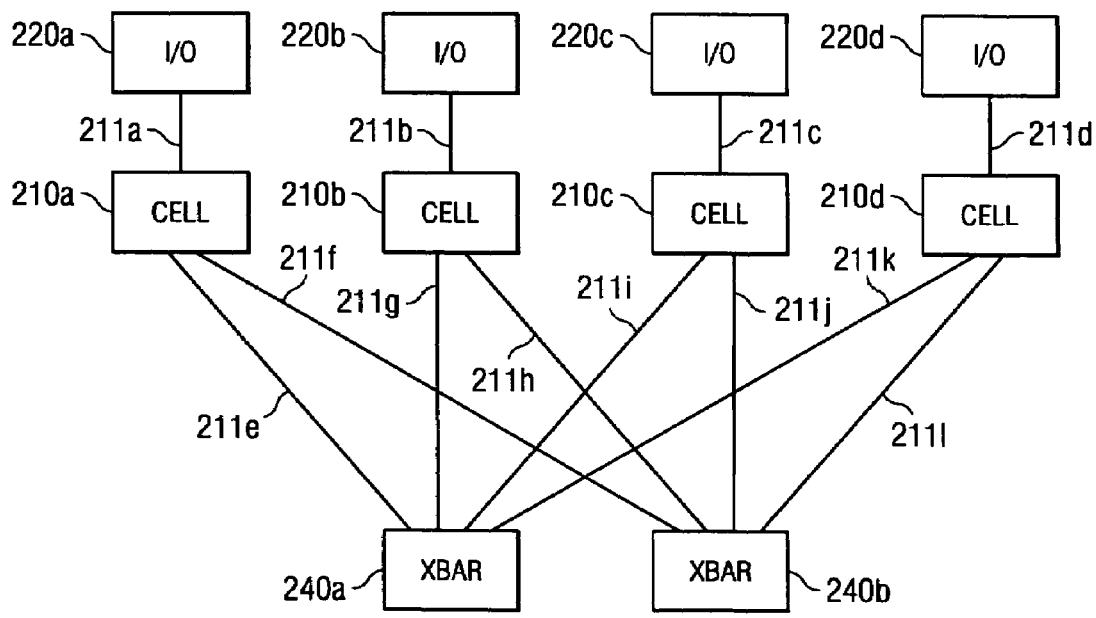

FIG. 2C provides a unified system fabric configuration in which input/output is scaled with computing capacity. Specifically, a number of I/O sub-systems, shown here as I/O 220a-220d, are connected to corresponding ones of a number of processor sub-systems, shown here as cells 210a-210d. Cells 210a-210d are interconnected through crossbar switching apparatus, shown here as crossbar switches 240a and 240b. Accordingly, interfaces 211a-211d provide interconnection of I/O 220a-220d with corresponding ones of cells 210a-211d. Interfaces 211e-211l provide interconnection of cells 210a-210d. Each of interfaces 211a-211l utilizes a same physical interface and interface protocol, thereby providing flexibility with respect to interconnection of cells 210a-210d and I/O 220a-220d.

FIG. 2D provides low cost computing system configuration implementing a unified system fabric of an embodiment of the present invention. Specifically, a number of I/O sub-systems, shown here as I/O 220a and 220b, are connected to corresponding ones of a number of processor sub-systems, shown here as cells 210*a* and 210*b*. Cells 210*a* are 210*b* are interconnected through interfaces 211*a* and 211*b* while interfaces 211*c* and 211*d* provide interconnection of I/O 220*a* and 220*b* with corresponding ones of cells 210*a* and 211*b*. Each of interfaces 211*a*-211*d* utilizes a same physical interface and interface protocol, thereby providing flexibility with respect to interconnection of cells 210*a* and 210*b* and I/O 220*a* and 220*b*.

From the above, it can be seen that appreciable flexibility in system topology is provided using unified system fabric interfaces of embodiments of the present invention. Moreover, a system topology may be readily altered, such as to add, remove, or relocate, components throughout the life of the system. For example, any of the topologies of FIGS. 2A-2D may be provided using the same processor sub-systems, I/O sub-systems, and crossbar switching apparatus.

In providing an interface suitable for use in a unified system fabric according to embodiments of the invention, a width and speed of the physical interface is chosen to be sufficient to meet the bandwidth or other communication requirements of the most demanding system components (e.g., CPU) which will utilize the interface. In such an embodiment, multiple interfaces may be used to support multiple ones of such system components (e.g., multi-processors), whereas the bandwidth of one interface may be subdivided by a system component (e.g., I/O sub-system) to meet the bandwidth requirements of multiple devices (e.g., I/O cards).

As but one example of a physical interface configuration, such as may be used in providing a unified system fabric for use with a cell based multi-processor system such as the HP Superdome server system available from the Hewlett-Packard Company, differential signaling is used to facilitate reliable communications between components using different power planes (e.g., components disposed in different chassis). The exemplary physical interface configuration further uses an embedded clock signal, such as through use of 8B/10B encoding, to further isolate the components interfaced and thus support a wide range of configurations and topologies. A channel width of 20 channels, supporting 3.2 giga-transfers per second per channel (as may be a function of the particular drivers and receivers used in the interface link), is provided in an interface of this exemplary embodiment to support the bandwidth demand of the CPUs. According to embodiments of the invention, one or more channels of a channel width provided by a physical interface configuration provides a spare for use where a primary channel has failed or is otherwise unreliable. For example, in the foregoing exemplary embodiment, the $20^{th}$ channel may be a spare for use when one of the 19 other channels fails.

As but one example of an interface protocol configuration, such as may be used in providing a unified system fabric for use with a cell based multi-processor system such as the HP Superdome server system available from the Hewlett-Packard Company, a packet protocol is provided which is a superset of the capabilities of the components to be interconnected using the unified interface (e.g., CPU, memory, I/O adaptors, switch/crossbar components etcetera). For example, an interface protocol of a unified system fabric may have a superset of communications (e.g., control, query, response, etcetera communication messages) that are to be transmitted between each component of a group of components, such as the aforementioned CPU, Memory, I/O adaptors, and switch/crossbar components. The fields and values utilized with respect to packets communicated through a unified interface of an embodiment of the present invention may be derived from a superset all the things that are to be transmitted between components, both in the forward and reverse links, which are to be interconnected using the unified interface.

Because packets for a number of different components and component types are communicated over an interface of a unified system fabric of embodiments of the invention, a packet protocol of embodiments includes a header field or fields to facilitate recognition of an appropriate packet by a component. For example, a packet type (referred to herein as "P-type") header field and a transaction type (referred to herein as "T-type") header field are provided according to an embodiment of the present invention. A P-type header field may identify the packet type (e.g., flow control class) and length. A T-type header field may identify the particular transaction type associated with the packet. The combination of P-type and T-type header information defines the type of packet that is communicated over the unified interface according to embodiments of the invention. Accordingly, the type of data contained in a packet, the format of the data in a packet, the length of a packet, a packet flow control class, etcetera may all be established according to corresponding P-type and/or T-type header information.

In use, some packets will only exist in communications between particular components (e.g., between a processor and memory) and will not normally exist in communications between other components (e.g., between I/O and memory). Likewise, some packets will only exist in communications between the other components (e.g., between I/O and memory) and will not normally exist in communications between the particular components (e.g., between a processor and memory). The foregoing P-type and T-type header fields facilitate a common protocol, in which types of packets are defined separately from each other, so that by passing the correct type of packet across the interface the receiver side can recognize and utilize the packet and any data contained therein. Fields included in the packet protocol to support a particular type of component (e.g., CPU, memory, or I/O), but which is not utilized by a second type of component, will be ignored by the second type of component according to embodiments of the invention. Particular fields that are used by one type of component or transaction remain in packets providing information for a different type of component or transaction, although the data therein may be nulled, according to embodiments of the present invention. Additionally or alternatively, fields utilized according to embodiments of the invention may be overlaid to provide different data for use with respect to various types of component or transaction.

Header symbols may additionally or alternatively be provided in a packet header of embodiments of the present invention to provide further information with respect to a packet and/or data contained therein. For example, a header symbol, such as may include the above described P-type and T-type header fields, may be utilized to identify the start of a new packet, link selection information, destination information, source information, data ownership information, data security information, packet flow control information, transaction identification information, link retry information, flow control credit information. A header symbol may be utilized to carry virtual index information, byte mask information, sanity checking information, memory interleave information, address information, error mode information, and payload poisoned information. Any or all of the foregoing information, and various combinations thereof, may be included in one or more header symbol depending upon the particular packet being carried by the interface of the unified system fabric.

Different packet lengths are provided according to the foregoing exemplary embodiment in order to efficiently accommodate communications of differing size between the various components interconnected using the unified interface. For example, a "micropacket" is defined according to one embodiment to comprise one 8B/10B bit group for each of 19 channels, or 152 total bits. Packets of different lengths may be provided using the aforementioned micropacket. For example, three different packet lengths, e.g., packet lengths of 2, 4, and 18 symbols (1, 2, or 8 micropackets in length), where a symbol is 64 bits, may be provided from combinations of micropackets as shown in FIGS. 3A-3C. Each packet according to this exemplary embodiment contains 2 header symbols and 0, 2, or 16 data symbols. The use of such different packet lengths facilitates efficient communication of control and overhead signaling (e.g., packet length of 2 symbols) such as may be sent from processors to memories or I/O subsystems to request data, communication of small amounts of data (e.g., packet length of 4 symbols) such as may be used between processors and I/O subsystems to transfer I/O data, and communication of large amounts of data (e.g., packet length of 18 symbols) such as may be used between processors and memories to transfer lines of data that may be encached in the processors The packet layout illustrated in FIG. 3C is adapted to "pack" the data in order to minimize or eliminate unused bits. For example, the packet layouts of the embodiments illustrated in FIGS. 3A and 3B include 16 unused bits in each micropacket. However, the packet layout of FIG. 3C includes non-contiguous data symbols to fill all bit positions in the micropackets with information, dominate the bandwidth of interfaces of embodiments of the invention, such a packet layout will provide a substantial improvement in efficiency.

In operation according to an embodiment of the present invention, different size packets are handled through a packet type field. For example, the aforementioned P-type field may identify the length of the packet, such that a packet is decoded as either 1, 2, or 8 micropackets in length.

Each packet of an embodiment of the invention is in a particular flow control class, such as may be provided in the aforementioned P-type field, or other packet type information. For example, flow control class for a packet may be decoded directly from a packet type field, wherein packet type determines both length of the packet and which flow control class the packet is in. A plurality of different flow control classes (e.g., five) may be provided with respect to a computer system. According to embodiments, each flow control class moves independently of the other flow control classes. If a deadlock results in one flow control class, the other flow control classes continue to make forward progress.

Having determined the packet type, a transaction type field is decoded according to embodiments of the invention. For example, the aforementioned T-type field may be used to determine the actual packet type (e.g., a writeback packet, a read for private ownership packet, a read for shared ownership packet, etcetera). The combination of the packet type and transaction type field information may be used to determine how to decode additional fields in the packet.

For example, there are fields according to embodiments that are used for the particular request that is initiated (e.g., a processor is accessing memory, the processor may specify what address in memory is being accessed, which processor is accessing the memory, a transaction ID for tracking the request, etcetera). Additionally, there are fields according to embodiments that are used for flow controls (e.g., a sending component may maintain a count of the free space available in a receiving component's input queue, when the sending component sends a packet (the "downstream" direction), it decrements the free space count, when the receiving component removes a packet from it's input queue, it tells the sending component to increment it's free space count (this may be done by sending a command in the flow control fields of the next "upstream" packet) if the next packet that the sending component wishes to send is larger than the free space count, the sending component will wait till the count is greater than or equal to the size of the packet.). Including such flow control information in header fields according to embodiments of the present invention facilitates communication of this information without consuming bandwidth otherwise available for passing payload information. Link level retry information may be decoded from a packet field for use in implementing a retransmission when, after applying the parity and/or other error detecting checks, the receiving side does not receive data within the packet cleanly. As with the flow control information discussed above, link level retry information of embodiments is included in header fields so that this information does not consume payload bandwidth.

Embodiments of the present invention as described above facilitate the creation of new system topologies and products without requiring changes to chipsets and other circuitry. Accordingly, costs associated with silicon development are reduced, as are development times, through use of the concepts of the present invention.

What is claimed is:

1. A system providing a unified system fabric in a computer, said system comprising:

a first interface disposed between a first component of said computer system and a second component of said computer system, said first interface implementing an interface protocol; and a second interface disposed between said first component of said computer system and a third component of said computer system, said second interface implementing said interface protocol, wherein said first interface and said second interface comprise separate signal paths at said first component;

wherein said interface protocol includes a set of fields, wherein a subset of said fields is unique to communications between said first component and said second component and a subset of said fields is unique to communication between said first component and said third component;

wherein said first interface implements a first physical interface configuration and said second interface implements a second physical interface configuration;

wherein said first physical interface configuration comprises:
    differential signaling;
    an embedded clock signal; and
    at least spare channel for use where a primary channel has failed;

wherein said second physical interface configuration comprises:
    said differential signaling;
    said embedded clock signal; and
    at least one spare channel for use where a primary channel has failed.

2. The system of claim 1, wherein said first physical interface configuration and said second physical interface configuration differ only in a maximum transfer frequency.

3. The system of claim 1, wherein said interface protocol includes a plurality of predefined packet lengths.

4. The system of claim 3, wherein said predefined packet lengths include a packet length having no payload, a packet length having a small payload capacity, and a packet length having a large payload capacity.

5. The system of claim 3, wherein said interface protocol includes packet type information in packets communicated thereunder, wherein said packet type information facilitates a determination of a packet length and a packet flow control class.

6. The system of claim 1, wherein said interface protocol includes packet type information and transaction type information.

7. The system of claim 1, further comprising:
a crossbar switching apparatus disposed in a signal path of at least one of said first interface between said first component and said second component and said second interface between said first component and said third component.

8. The system of claim 1, wherein said first component comprises a processor sub-system, said second component comprises a processor sub-system, and said third component comprises an input/output sub-system.

9. The system of claim 8, wherein said first component processor sub-system comprises a processor cell of a cell based computer system architecture.

10. A method for providing a unified computer system fabric, said method comprising:
determining a physical interface configuration which is optimized for communication between at least one of a first component, a second component, and a third component having a most demanding requirement;
establishing an interface protocol having a superset of communications that are to be transmitted between each of said first component, said second component, and said third component;
providing a first interface between said first component and said second component, said first interface implementing said physical interface configuration and said interface protocol; and
providing a second interface between said first component and said third component, said second interface implementing said physical interface configuration and said interface protocol;
wherein said physical interface configuration comprises:
differential signaling;
an embedded clock signal; and
at least one spare channel for use where a primary channel has failed.

11. The method of claim 10, wherein said establishing said interface protocol comprises:
including a set of fields, said set of fields having a subset of fields unique to communications between said first component and said second component and a subset of fields unique to communication between said first component and said third component in said interface protocol.

12. The method of claim 10, wherein said providing said first interface comprises:
coupling said first component to said second component through a crossbar switching apparatus.

13. The method of claim 10, wherein said first component comprises a processor sub-system, said second component comprises a processor sub-system, and said third component comprises an input/output sub-system.

14. The method of claim 10, wherein said computer system comprises a cell based architecture and at least one of said first component, said second component, and said third component comprises a processor cell component of said cell based architecture.

15. The method of claim 10, wherein said most demanding requirement comprises a requirement selected from the group consisting of bandwidth, bit error rate, physical space, and cost.

16. The method of claim 10, further comprising:
determining a particular computer system topology from a plurality of computer system topologies for said computer system using said first component, said second component, and said third component, wherein said first interface and said second interface are implemented in each topology of said plurality of computer system topologies.

17. The method of claim 16, wherein said plurality of computer system topologies include a compute intensive topology, an input/output intensive topology, a topology in which input/output scales with computing capacity, and a low cost low cost computing system topology.

18. A computer system having a unified system fabric, said system comprising:
a processor cell component;
an input/output component;
a computer system component operable with at least one of said processor cell component and said input/output component;
a first interface coupling said processor cell component to said input/output component, said first interface implementing a physical interface configuration and an interface protocol; and
a second interface coupling said computer system component to at east one of said processor cell component and said input/output component, said second interface implementing said physical interface configuration and said interface protocol;
wherein said physical interface configuration comprises:
differential signaling;
an embedded clock signal; and
at least one spare channel for use where a primary channel has failed.

19. The system of claim 18, wherein said computer system component is selected from the group consisting of:
a processor cell component;
an input/output component; and
a memory sub-system.

20. The system of claim 18, wherein said first and second interfaces provide separate signal paths coupled to said processor cell component.

21. The system of claim 18, further comprising:
a crossbar switching apparatus disposed in a link of at least one of said first interface and said second interface.

22. A system for providing a unified computer system fabric, said system comprising:
means for establishing an interface protocol having a superset of communications that are to be transmitted between each of a first component, a second component, and a third component;
means for interfacing said first component and said second component, said means for interfacing said first component and said second component implementing a first physical interface and said interface protocol; and
means for interfacing said first component and said third component, said means for interfacing said first component and said second component implementing a second physical interface and said interface protocol;
wherein said first physical interface comprises:
differential signaling;
an embedded clock signal; and at least one spare channel for use where a primary channel has failed;
wherein said second physical interface comprises:
said differential signaling;
said embedded clock signal; and
at least one spare channel for use where a primary channel has failed.

23. The system of claim 22, wherein said first component comprises a processor sub-system, said second component comprises an input/output sub-system, and said third component comprises a crossbar switch sub-system.

24. The system of claim 22, wherein said first physical interface and said second interface differ in a maximum transfer frequency.

* * * * *

UNITED STATES PATENT AND TRADEMARK OFFICE
CERTIFICATE OF CORRECTION

| | |
|---|---|
| PATENT NO. | : 7,471,623 B2 |
| APPLICATION NO. | : 10/998239 |
| DATED | : December 30, 2008 |
| INVENTOR(S) | : Gary B. Gostin et al. |

It is certified that error appears in the above-identified patent and that said Letters Patent is hereby corrected as shown below:

In column 8, line 53, in Claim 1, after "least" insert -- one --.

In column 10, line 17, in Claim 17, after "cost" delete "low cost".

In column 10, line 30, in Claim 18, delete "east" and insert -- least --, therefor.

Signed and Sealed this

Fourteenth Day of April, 2009

JOHN DOLL
*Acting Director of the United States Patent and Trademark Office*